United States Patent
Vélez De Mendizábal Alonso et al.

(10) Patent No.: US 10,414,497 B2
(45) Date of Patent: Sep. 17, 2019

(54) INTEGRATED DETACHABLE BALLISTIC SHIELD

(71) Applicant: AIRBUS OPERATIONS S.L., Getafe (ES)

(72) Inventors: Iker Vélez De Mendizábal Alonso, Getafe (ES); Esteban Martino González, Getafe (ES); Carlos García Nieto, Getafe (ES); Edouard Menard, Getafe (ES); Enrique Guinaldo Fernández, Getafe (ES); Soledad Crespo Peña, Getafe (ES); Jesús Javier Vázquez Castro, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 76 days.

(21) Appl. No.: 15/704,114

(22) Filed: Sep. 14, 2017

(65) Prior Publication Data
US 2018/0072423 A1  Mar. 15, 2018

(30) Foreign Application Priority Data

Sep. 14, 2016  (EP) ..................................... 16382426

(51) Int. Cl.
*B64D 7/00* (2006.01)
*B32B 5/02* (2006.01)
(Continued)

(52) U.S. Cl.
CPC .................. *B64D 7/00* (2013.01); *B32B 5/02* (2013.01); *B32B 15/14* (2013.01); *B64C 1/062* (2013.01);
(Continued)

(58) Field of Classification Search
CPC .............. B32B 15/14; B32B 2307/558; B32B 2571/02; B32B 2605/18; B32B 5/02;
(Continued)

(56) References Cited

U.S. PATENT DOCUMENTS 4,783,362 A * 11/1988 Thornton ................ B29C 35/08
                                                    428/408
6,951,162 B1   10/2005 Shockey et al.
(Continued)

FOREIGN PATENT DOCUMENTS

| EP | 1682348 | 7/2006 |
| EP | 2610164 | 7/2013 |
| WO | 2015119693 | 8/2015 |

OTHER PUBLICATIONS

European Search Report, dated Dec. 14, 2016, priority document.

*Primary Examiner* — Frances Tischler
(74) *Attorney, Agent, or Firm* — Greer, Burns & Crain, Ltd.

(57) ABSTRACT

A lightweight shield for aircraft protection against threat of high energy impacts, which comprises, a structural layer that has a first side and a second side, the first side being intended for receiving the impact, and a ballistic material layer for absorbing high energy impacts, having a first side and a second side. The first side of the ballistic material layer is faced to the second side of structural layer and joined to the structural layer via a progressively detachable interface and, the second side of the ballistic material layer is a free surface.

10 Claims, 3 Drawing Sheets

(51) Int. Cl.
  *B32B 15/14* (2006.01)
  *B64C 1/06* (2006.01)
  *B64C 1/12* (2006.01)
  *F01D 21/04* (2006.01)
  *F41H 5/04* (2006.01)

(52) U.S. Cl.
  CPC ............... *B64C 1/066* (2013.01); *B64C 1/12* (2013.01); *F01D 21/045* (2013.01); *F41H 5/0457* (2013.01); *F41H 5/0471* (2013.01); *B32B 2307/558* (2013.01); *B32B 2571/02* (2013.01); *B32B 2605/18* (2013.01)

(58) Field of Classification Search
  CPC ........... B32B 9/00; B64C 1/062; B64C 1/066; B64C 1/12; B64C 1/00; B64D 7/00; F01D 21/045; F41H 5/0457; F41H 5/0471
  See application file for complete search history.

(56) References Cited

U.S. PATENT DOCUMENTS

| | | |
|---|---|---|
| 2013/0214090 A1 | 8/2013 | Folch Cortes et al. |
| 2015/0268010 A1* | 9/2015 | Strauss .................. F41H 7/044 89/36.02 |

* cited by examiner

INTEGRATED DETACHABLE BALLISTIC SHIELD

CROSS-REFERENCES TO RELATED APPLICATIONS

This application claims the benefit of the European patent application No. 16382426.1 filed on Sep. 14, 2016, the entire disclosures of which are incorporated herein by way of reference.

TECHNICAL FIELD OF THE INVENTION

The present invention belongs to the field of aircraft structures and the aircraft protection against threat of high energy impacts, more particularly, to the field of lightweight ballistic shield for protection aircraft structures against high energy impacts.

BACKGROUND OF THE INVENTION

There are known aircraft equipped with engines configurations such as Open Rotor (OR) or Turbofan Boundary Layer Ingestion (BLI). In these aircraft, potential hazardous events occur, such as a Propeller Blade Release (PBR) event, i.e., an event where an external blade of one turboprop engine comes off and hits the fuselage, or an Uncontained Engine Rotor Failure (UERF) event, i.e., an event where a part of the internal rotor of the engine breaks, it is released and hits the fuselage, can generate large damage on the fuselage, and also in the opposite engine.

Although engine manufacturers are making efforts to reduce the probability of such failure events, experience shows that PBR and UERF events that can lead to catastrophic events continue to occur.

In the case of a Propeller Blade Release event no special protections are applied in current aircraft, however, some studies have been performed in order to assess the carbon fiber composite thickness required by the fuselage in the potential impact area to resist such an event.

In terms of protection for UERF events, there are applied some protections in order to minimize the hazards of an engine or an Auxiliary Power Unit (APU) rotor failures. Additionally, a particular protection is applied on fuel tanks if they are located in impact areas, in order to minimize the possibility of fuel cell damage. The shielding of aluminum or titanium is typically used for these events.

As it is well known, weight is a fundamental aspect in the aeronautic industry and therefore there is a trend to use structures of a composite material instead of a metallic material even for primary structures such as fuselages. However, the usual composite materials made of carbon fibers, compared to conventional light weight metallic materials, presents a lower impact resistance and lower damage tolerance capabilities. Also, no plasticity behavior as on metallic materials is present in composite materials and they are not able to absorb high strain energy amounts when deforming.

Depending on the threat, the most widely spread ballistic composite armors are typically composed of layers of different materials, such as metal, fabrics and ceramics or by sole fabrics of materials with good ballistic performance, also called "dry" fabrics.

Thus, there is a need of fuselage structures capable of satisfying the safety requirements and ballistic performance particularly when they are made up of composite materials.

SUMMARY OF THE INVENTION

The present invention provides an alternative solution for the aforementioned problems, by a lightweight shield for protection against the threat of high energy impacts.

In a first inventive aspect, the invention provides a lightweight shield for aircraft protection against the threat of high energy impacts, which comprises,
- a structural layer having a first side and a second side, wherein the first side is intended for receiving the impact,
- a ballistic material layer for absorbing high energy impacts, having a first side and a second side,
  wherein the first side of the ballistic material layer is faced to the second side of the structural layer and joined to the structural layer by means of a progressively detachable interface and, the second side of the ballistic material layer is a free surface.

Throughout this entire document, "free surface" will be understood as a surface which is free of being in contact with elements, i.e., fixing means or any other non-ballistic layer.

Advantageously, the application of a ballistic material on structural layers provides a lightweight and resistant shield for protection. Additionally, the ballistic material provides a high thermal stability which also avoids fire propagation.

Furthermore, the joint between the structural layer and the ballistic material layer by a progressively detachable interface, advantageously, allows the ballistic material layer to easily detach from the structural layer. Thus, the part of the ballistic material layer, which is detached, behaves as much as possible as a membrane working on tension when an impact occurs on the structural layer.

In a particular embodiment, the ballistic material layer is at least a layer comprising dry high strength and high deformation fibers wherein dry fibers are those fibers free of resin or with a small amount of resin such that the small amount of resin allows the fibers to elongate under impact without a cross-interference between them.

In another embodiment, the ballistic material layer comprises a plurality of ballistic material sub-layers.

Throughout this entire document, "dry fiber" will be understood as fibers of a fabric material, being the fibers, embedded in a resin matrix with a lower amount of resin, or without any resin matrix content. Thus, the lower the amount of resin the fabric has (the more "dry" the fibers are), and advantageously, a better behavior against impact is achieved as the deformation of a dry fiber during the impact does not prevent the deformation of the surrounding fibers.

Advantageously, the fabric with dry fibers provides a material with high strength and deformation capabilities as it has no restriction and can work freely as a membrane. Additionally, the dry fabric can deform in a large confined area due to the lower stiffness of the surrounding materials. Thus, the ballistic performance capabilities of solely dry fabrics are better than ballistic fabrics which are fully embedded in a plastic matrix, or ballistic fabrics which are combined with carbon fibers fully embedded in plastic matrix, or ballistic fabrics bonded to carbon fiber laminate.

In a particular embodiment, dry fibers are aramids such as, i.e., Kevlar and Twaron; ultra-high molecular weight Polyethylene (UHMWPEs) such as, i.e., Dyneema; Polypropylene such as, i.e., Innegra, . . . .

In a particular embodiment, the structural layer is a carbon fiber laminate which comprises a resin matrix. In a more particular embodiment, the resin matrix of the carbon fiber laminate is a thermoplastic or a thermo stable resin matrix.

In another particular embodiment, the structural layer is a metallic layer.

In a particular embodiment, the progressively detachable interface is selected from the group consisting of a peel ply layer, a non-stick release film such as Polyimide (PI), Polyetheretherketone (PEEK), Polytetrafluoroethylene (PTFE), perfluoroalcoxy (PFA), Fluorinated ethylene propylene (FEP) layer, and combinations thereof.

Throughout this entire document, "peel ply" layer will be understood as a layer which comprise a first side with lower adhesion to a structural layer and a second side which has a particular texture for improving the adhesion to another layer.

Advantageously, the peel ply layer and the non-stick release film layer provide an interface layer which is easily removed from the structural layer in a progressive way due to the impact.

In a particular embodiment, the progressively detachable interface is a patterned layer. In a more particular embodiment, the progressively detachable interface is a hexagonal patterned layer.

Advantageously, the patterned layer allows some of the resin from the structural layer to impregnate the ballistic material layer during the curing or infusing process. Additionally, the patterned layer allows handling of the ballistic material layer during the lay-up process of the structural layer. Furthermore, a hexagonal pattern advantageously provides a configuration that presents the minimum number of coinciding lines in a node, thus providing the minimum required attachment in a node area.

In another particular embodiment, the progressively detachable interface is a continuous layer.

Advantageously, the configuration of a progressively detachable interface as a continuous layer provides high static strength and stability capabilities, as well as it fulfills the aforementioned impact requirements.

In a particular embodiment, the ballistic material layer comprises a small amount of resin diffused from the structural layer through a plurality of discrete detachable joint points of the interface.

In another particular embodiment, the ballistic material layer comprises a small amount of resin diffused from the structural layer of carbon fiber laminate through a plurality of discrete detachable joint points of the interface. In a more particular embodiment, the plurality of discrete detachable joint points of the interface is thermoplastic resin joint points.

Advantageously, the configuration of diffused resin from the structural layer to the ballistic material layer through the discrete detachable joint points, allows some of the resins of the structural part impregnate the ballistic material layer during the curing or infusion process, and allows handling of the ballistic material layer during the lay-up process.

In a second inventive aspect, the invention provides an aircraft comprising a lightweight shield for protection against the threat of high energy impacts according to the first inventive aspect.

In a particular embodiment, the at least one lightweight shield according to the first inventive aspect is located:
 in the fuselage of the aircraft,
 or in the empennage skin of the aircraft,
 or in the wings of the aircraft,
 or in the internal and/or external case engine of the aircraft,
 or in any combination of them.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figures 1A, 1B:
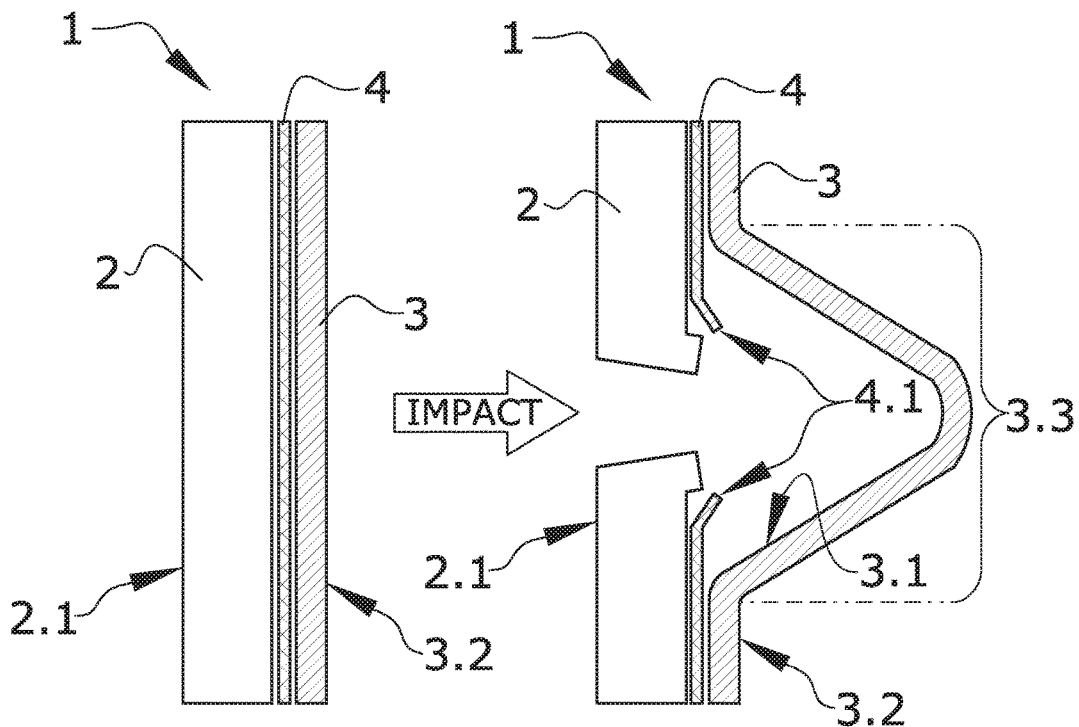
FIG. 1a shows a lightweight shield according to the present invention.
FIG. 1b shows a lightweight shield when an impact occurs and the ballistic material is detached from the structural layer.
Figure 2:
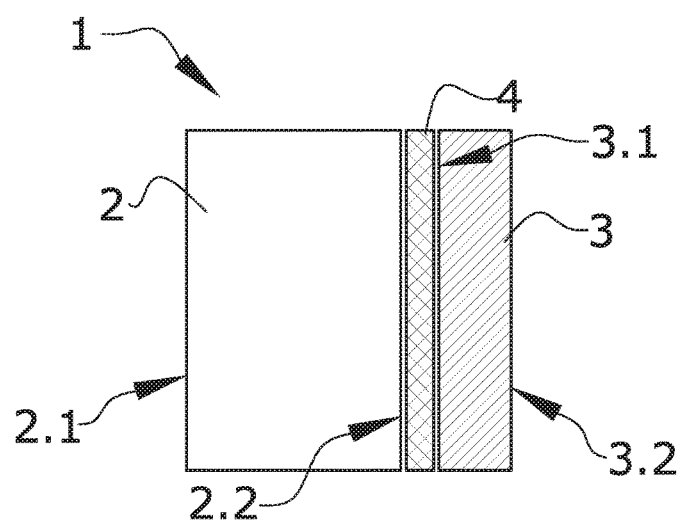
FIG. 2 shows a detail view of the lightweight shield according to the present invention.

FIGS. 1a and 1b show a lightweight shield (1) for aircraft protection against impacts that comprises a structural layer (2) and a ballistic material layer (3). The structural layer (2) has a first side (2.1) which is faced to the threat of high energy impacts, and a second side (2.2) faced to the ballistic material layer (3). The ballistic material layer (3) is provided for absorbing the energy of an impact, and comprises a first side (3.1) faced to the second side (2.2) of the structural layer (2), and a second side (3.2) which is a free surface. Furthermore, the first side (3.1) of the ballistic material layer (3) is joined to the second side (2.2) of the structural layer (2). The joint between the structural layer (2) and the ballistic material layer (3) is performed by means of a progressively detachable interface (4) (as is shown in FIG. 2).

FIG. 1b shows the behavior of the ballistic material layer (3) when an impact occurs on the first side (2.1) of the structural layer (2). When an impact impacts on the first side (2.1) of the structural layer (2), the structural layer (2) is broken, and progressively, the interface (4) is broken and some zone (4.1) of the interface (4) is detached, and a zone (3.3) of the ballistic material layer (3) is detached due to the impact. The detached zone (3.3) of the ballistic material layer (3) works as a membrane absorbing the most part of the impact energy. Also, the detached zone (4.1) of the interface (4) absorbs some impact energy during the detaching process.

The progressively detachable interface (4) allows the ballistic material layer (3) to remain fixed to the structural layer (2), and when an impact occurs, the interface (4) helps with the ballistic material detachment, and the detached zone (3.3) of the ballistic material layer (3) works in tension as a membrane, and the zone of the ballistic material layer which is not detached remains fixed to the structural layer (2).

In a particular example, wherein the interface (4) is a peel-ply layer, when an impact occurs, the peel ply progressively detaches from the structural layer (2), and this interface (4) also absorbs some of the impact energy by means of the peeling of the peel ply layer. The peel ply allows the zone of the ballistic material layer (3) which is not detached from the structural layer (2) to remain joined to the structural layer (2) due to the way that the dry fibers work. Additionally, the peel ply allows the detached zone (3.3) of the ballistic material layer (3) which is affected by the impacts progressively and in a radially way to detach from the structural layer (2), in such a way that the zone detached (3.3) will be working as a membrane due to its deformation providing a mechanical process of energy absorption that involves a wide area of the interface (4) and the ballistic material layer (3).

In a particular example, wherein the structural layer (2) is a carbon fiber laminate with a resin matrix, the lightweight shield (1) is performed positioning a peel-ply layer or a non-stick release film layer such as Polyimide (PI), Polyetheretherketone (PEEK), Polytetrafluoroethylene (PTFE), perfluoroalcoxy (PFA), or Fluorinated ethylene propylene (FEP), between the carbon fiber laminate and the ballistic material layer (3) prior to curing or infusing the shield (1) in a single shot curing cycle, or in the resin injection, or infusion process.

Figure 3:
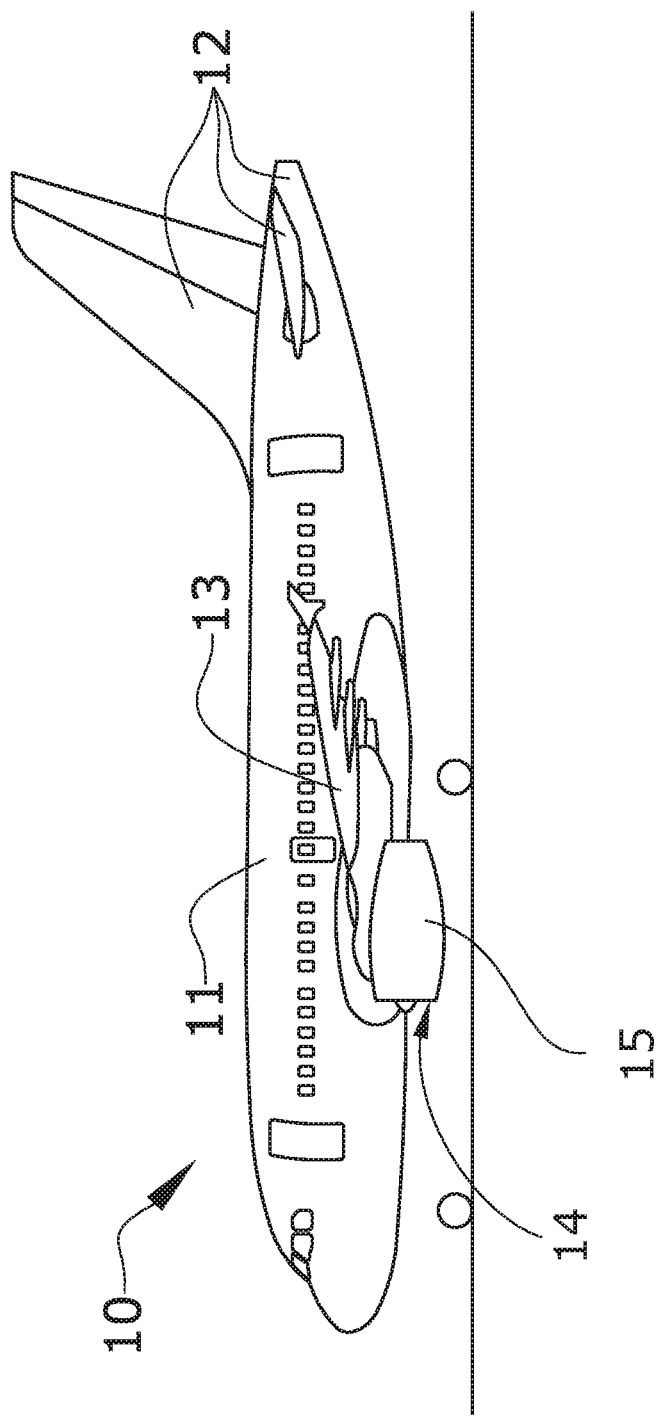
FIG. 3 shows an aircraft comprising a lightweight shield according to the present invention.

FIG. 3 shows an aircraft (10) that comprises a fuselage (11), wings (13), empennage (12) and internal (14) and external (15) case engines. The threat of high energy impacts due to, for example, a Propeller Blade Release, exists mainly on the fuselage (11), wings (13), empennage (12) and internal (14) and external (15) case engines of the aircraft (10).

Figure 4:
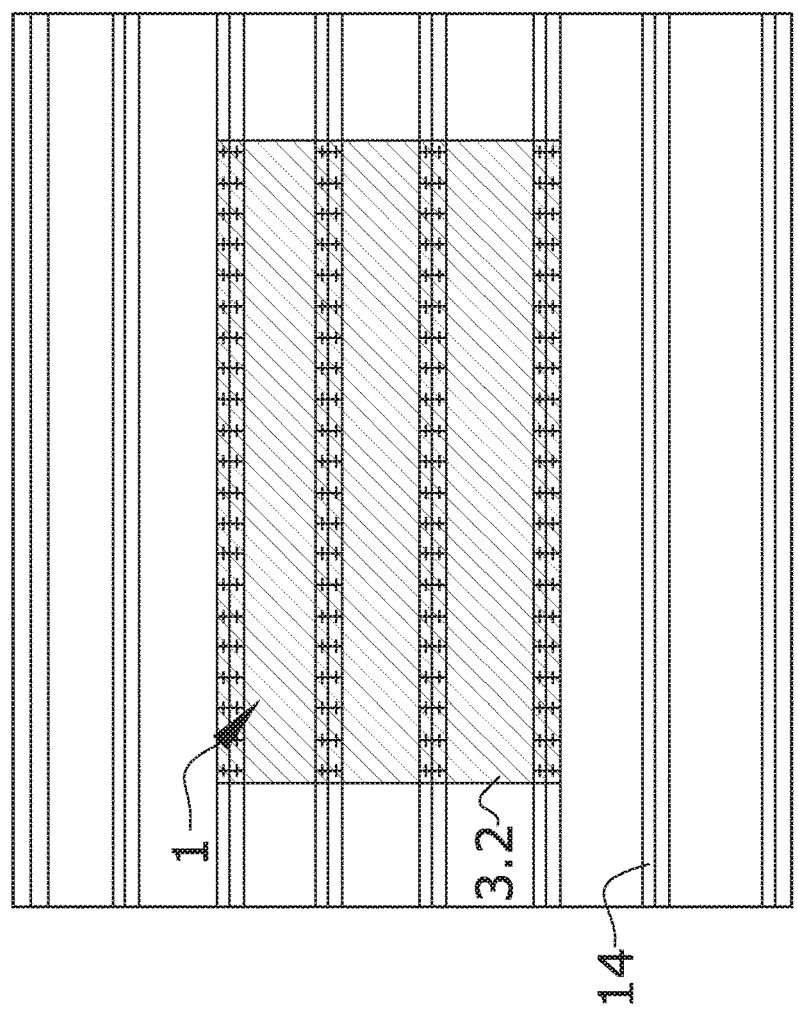
FIG. 4 shows a section of an aircraft fuselage which comprises a lightweight shield according to the present invention.

FIG. 4 shows a section of the aircraft fuselage (11) which comprises a lightweight shield (1) of the present invention that comprises a structural layer (2) corresponded to the fuselage structure of the aircraft (10), and ballistic material layer (3) located inside the fuselage (11). In manufacturing, the lightweight shield (1) could be integrated with stiffening elements of the fuselage (11), i.e., stringers (14), in a one-shot curing cycle, in the areas where the stiffening elements and the shield (1) coincide.

In a particular example, where a ballistic material layer (3) is arranged inside the fuselage (11) of the aircraft (10), the second side (3.2) of the ballistic material layer (3) will be faced within the aircraft fuselage (11). Thus, the second side (3.2) of the ballistic material layer (3) is mostly free of being in contact with other structural elements of the aircraft (10). Also, some fixing means could be fixing the ballistic material layer (3) to the structural layer (2), being the fixing means located in some discrete points of the second side (3.2) of the ballistic material layer (3).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lightweight shield for aircraft protection against threat of high energy impacts, comprising:
    a structural layer having a first side and a second side, wherein the first side is intended for receiving the impact,
    a ballistic material layer for absorbing high energy impacts, having a first side and a second side, wherein the first side of the ballistic material layer is faced to the second side of structural layer and joined to said structural layer by means of a progressively detachable interface, and the second side of the ballistic material layer is a free surface,
    wherein the progressively detachable interface is selected from the group consisting of a peel ply layer, a non-stick release film layer, and combinations thereof,
    wherein the ballistic material layer comprises a small amount of resin diffused from the structural layer through a plurality of discrete detachable joint points of the interface.

2. A lightweight shield according to claim 1, wherein the ballistic material layer is at least a layer comprising dry high strength and high deformation fibers, wherein dry fibers are those fibers free of resin or with a small amount of resin, such that said small amount of resin allows fibers to elongate under impact without a cross-interference between them.

3. A light weight shield according to claim 1, wherein the structural layer is a carbon fiber laminate which comprises a resin matrix.

4. A light weight shield according to claim 3, wherein the resin matrix of the carbon fiber laminate is a thermoplastic resin matrix.

5. A light weight shield according to claim 3, wherein the resin matrix of the carbon fiber laminate is a thermostable resin matrix.

6. A lightweight shield according to claim 1, wherein the progressively detachable interface is a patterned layer.

7. A lightweight shield according to claim 6, wherein the patterned layer is a hexagonal patterned layer.

8. A lightweight shield according to claim 4, wherein the ballistic material layer comprises a small amount of resin diffused from the structural layer of carbon fiber laminate through a plurality of discrete detachable joint points of the interface, said plurality of discrete detachable joint points being thermoplastic resin joint points.

9. An aircraft comprising a lightweight shield for protection against threat of high energy impacts according to claim 1.

10. The aircraft according to claim 9, wherein the at least one lightweight shield is located:
    in the fuselage of the aircraft, or
    in the empennage skin of the aircraft, or
    in the wings of the aircraft, or
    in the internal and/or external case engine of the aircraft, or
    in any combination of them.

* * * * *